US010678009B2

(12) United States Patent
Gallo et al.

(10) Patent No.: US 10,678,009 B2
(45) Date of Patent: Jun. 9, 2020

(54) OPTICAL FIBER CABLE AND METHOD OF FORMING AN OPTICAL FIBER CABLE

(71) Applicant: CORNING OPTICAL COMMUNICATIONS LLC, Hickory, NC (US)

(72) Inventors: Emanuela Gallo, Berlin (DE); Gerhard Merbach, Neustadt bei Coburg (DE); Waldemar Stöcklein, Coburg (DE)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 15/843,568

(22) Filed: Dec. 15, 2017

(65) Prior Publication Data

US 2018/0172938 A1   Jun. 21, 2018

Related U.S. Application Data

(63) Continuation of application No. PCT/US2016/037553, filed on Jun. 15, 2016.

(51) Int. Cl.
*G02B 6/30* (2006.01)
*G02B 6/44* (2006.01)

(52) U.S. Cl.
CPC ......... *G02B 6/4436* (2013.01); *G02B 6/4486* (2013.01)

(58) Field of Classification Search
CPC ............................. G02B 6/4436; G02B 6/4486
See application file for complete search history.

(56) References Cited

U.S. PATENT DOCUMENTS

| 4,249,353 A | 2/1981 | Berry |
| 4,334,322 A | 6/1982 | Clark, III |
| 4,835,054 A | 5/1989 | Scarpa |
| 4,909,591 A * | 3/1990 | Capol ................. G02B 6/4407 385/100 |
| 5,343,549 A * | 8/1994 | Nave .................... G02B 6/4434 385/103 |
| 6,701,047 B1 * | 3/2004 | Rutterman .......... G02B 6/4413 385/102 |
| 9,459,421 B2 * | 10/2016 | Gibbs ................. G02B 6/4434 |
| 9,690,062 B2 * | 6/2017 | Hurley ................ G02B 6/4434 |
| 9,693,321 B2 | 6/2017 | Venkatraman et al. |

(Continued)

FOREIGN PATENT DOCUMENTS

CN    201570304 U    9/2010
CN    202474735 U    10/2012

(Continued)

OTHER PUBLICATIONS

Machine translation of EP 0484744.*

(Continued)

*Primary Examiner* — Ellen E Kim
(74) *Attorney, Agent, or Firm* — William D. Doyle (57) ABSTRACT

An optical fiber cable includes a cable jacket, a plurality of buffer tubes arranged on the inside of the cable jacket, a plurality of optical fibers arranged on the inside of each buffer tube, and a fire-retardant material having intrinsic tire-retarding properties. The fire-retardant material may be a filling material disposed between the cable jacket and the buffer tubes.

18 Claims, 5 Drawing Sheets

(56) References Cited

U.S. PATENT DOCUMENTS

| | | |
|---|---|---|
| 2003/0180017 A1 | 9/2003 | Hayano et al. |
| 2004/0218563 A1 | 11/2004 | Porter et al. |
| 2005/0073979 A1 | 4/2005 | Barber et al. |
| 2013/0065051 A1 | 3/2013 | Chen et al. |
| 2013/0129290 A1* | 5/2013 | Keller .................... G02B 6/441 385/112 |
| 2013/0295980 A1 | 11/2013 | Reuven et al. |
| 2014/0024402 A1 | 1/2014 | Singh |
| 2014/0064683 A1* | 3/2014 | Weimann ............. G02B 6/4436 385/113 |
| 2015/0131952 A1 | 5/2015 | Gallo et al. |

FOREIGN PATENT DOCUMENTS

| | | |
|---|---|---|
| CN | 203070815 U | 7/2013 |
| CN | 204009157 U | 12/2014 |
| DE | 3631250 A1 | 3/1988 |
| EP | 0484744 A2 | 5/1992 |
| EP | 1316830 A2 | 6/2003 |
| WO | 2015102819 A1 | 7/2015 |

OTHER PUBLICATIONS

International Search Report and Written Opinion of the International Searching Authority; PCT/IL2016/050586 dated Sep. 19, 2016; 11 Pages; European Patent Office.

Duquesne et al; "Intumescent Paints: Fire Protective Coatings for. Metallic Substrates"; Surface and Coatings Technology; 180-181 (2004) pp. 302-307.

European Search Report for EP15172958.9 dated Nov. 30, 2015; 7 Pages; European Patent Office.

Gu et al; "Study on Preparation Flame-Retardant Mechanism Analysis of Intumescent Flame-Retardant Coatings", Surface & Coatings Technology; 201 (2007) pp. 7835-7841.

Horacek et al; "The Importance of Intumescent Systems For Fire Protection of Plastic Materials"; Polym Int, 49; (2000) pp. 1106-1114.

International Search Report and Written Opinion of the International Searching Authority; PCT/US2016/037553; dated Sep. 19, 2016; 13 Pages; European Patent Office.

* cited by examiner

OPTICAL FIBER CABLE AND METHOD OF FORMING AN OPTICAL FIBER CABLE

RELATED APPLICATIONS

This application is a continuation of International Application No. PCT/US2016/037553, filed on Jun. 15, 2016, which claims the benefit of priority to European Patent Application No. EP 15172958.9, filed Jun. 19, 2015, both applications being incorporated herein by reference.

BACKGROUND

The application refers to an optical fiber cable and to a method of forming an optical fiber cable.

Optical fiber cables, in particular indoor cables, often contain flammable materials such as plastic materials which, once having caught fire, bear the risk of propagating the fire from one spot in a building to further rooms or areas. Combustible materials widely in use are, for instance, PE, PP, EVA and other plastics or synthetic materials, for instance thermoplastics. These and other flammable materials are often contained in the material of the cable jacket or of the buffer tubes which are arranged within the cable jacket and each surround a respective number of optical fibers.

In order to avert the fire hazard of optical fiber cables, replacement materials instead of the above-mentioned combustible materials could be used during cable fabrication, especially for the cable jacket and/or the buffer tubes. Furthermore, optical fiber cables containing combustible materials might additionally contain a fire-retardant material as a component, that is as an ingredient in a material composition of the fiber jacket and/or of the buffer tubes, thereby rendering them more resistant to fire. Furthermore, optical fiber cables might comprise, around the cable jacket which per se might be made of a combustible material, an additional outer fire-protecting layer which prevents the cable jacket from being ignited.

However, any of the above approaches implies increased costs and/or manufacturing effort to obtain fire protection for the optical cable.

There is a need to provide an optical fiber cable that is fire-resistant or even self-extinguishable when in contact with fire and that is less costly and/or more efficient to produce. Furthermore, there is a need to provide a method of forming a fire-resistant optical fiber cable.

SUMMARY

In accordance with aspects of the present invention, an optical fiber cable includes a cable jacket, a plurality of buffer tubes arranged on the inside of the cable jacket, a plurality of optical fibers arranged on the inside of each buffer tube, and a fire-retardant material having intrinsic fire-retarding properties. The fire-retardant material may be a filling material disposed between the cable jacket and the buffer tubes.

In accordance with yet other aspects of the present invention, a method of forming an optical fiber cable includes a) assembling a cable core comprising a plurality of buffer tubes each enclosing a plurality of optical fibers on the inside, b) applying a fire-retardant material around the cable core, and c) forming a cable jacket around the cable core and the fire-retardant material, thereby providing an optical fiber cable which comprises the fire-retardant material as a filling material disposed between the buffer tubes and the cable jacket.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

According to the present application, a fire-retardant material is provided in the optical fiber cable. However, in contrast to conventional solutions, the fire-retardant material is neither provided in the material of a cable jacket nor in the material of the buffer tubes. Rather, the fire-retardant material is provided in the optical fiber cable as a separate material so as to at least partially fill interspaces or interstices between and/or around the buffer tubes on the inside of the cable jacket. Due to the provision of the fire-retardant material, particularly in the outer interstices around the buffer tubes, even in fiber cables having buffer tubes and/or a cable jacket made of conventional, not fire-retardant materials, efficient fire protection is achieved nonetheless. Moreover, by providing the fire-retardant material, as a material separate from the buffer tubes and from the cable jacket, a very inexpensive way of fire-protection is offered since no re-design of the cable construction is required.

According to the present application, a fire-retardant material is a material having intrinsic fire-retardant properties. Accordingly, it does not suffice to provide any extra filling material between the buffer tubes and the cable jacket; instead a material has to be chosen which per se has fire-retardant properties, for instance a material that is fire-resistant or even self-extinguishing when exposed to fire.

In the interstices between the buffer tubes and the cable jacket, the fire-retardant material may even be provided in the form of a powder, a granulate, a dried paste or a dispersion or in further aggregate phases, physical conditions or forms which conventionally are not considered appropriate for use in optical cables. Particularly, the fire-retardant material provided as a filling material between the cable jacket and the buffer tubes may be provided as a pure substance, that is in unmixed and/or chemically uncombined condition. In contrast to fire-retardant materials conventionally provided as a component or ingredient of a composite material of buffer tubes or cable jackets, the separate, unmixed and uncombined fire-retardant material, since it can be filled in as a pure substance, need not be chemically treated, conditioned or otherwise prepared for proper blending with further components of a material composition. Accordingly, even a priori inadequate forms such as a powder, a granulate, a (dried) paste or a dispersion become realizable options regarding the state or condition of the fire-retardant material to be administered. Inter alia, even powders or granulates of the fire-retardant material which are brittle or prone to disintegrating or falling off may be filled in the interstices in the optical fiber cable around and/or outside the buffer tubes.

Some exemplary embodiments of the application are now described in detail with reference to the Figures.

Figure 1:
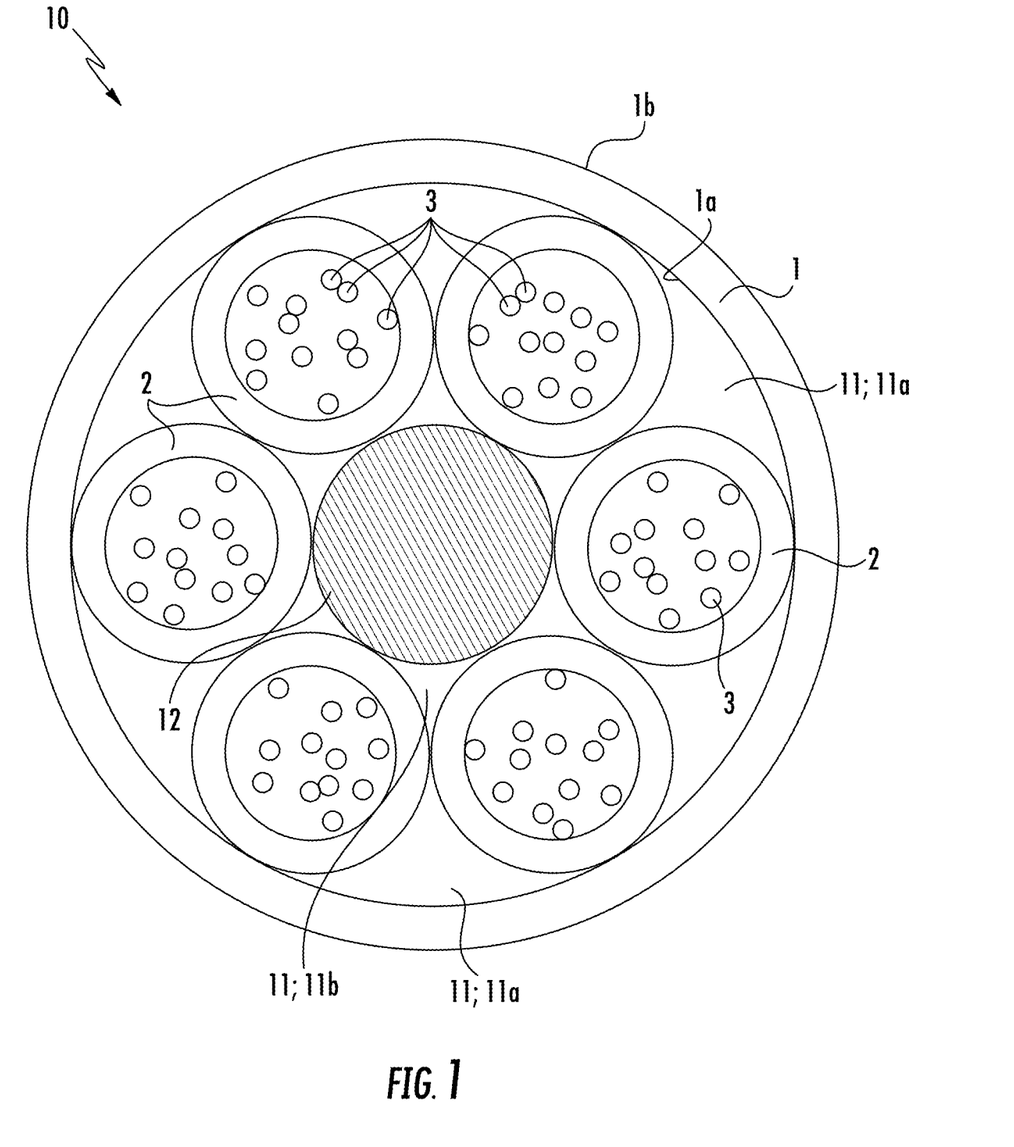
FIG. 1 shows a conventional optical fiber cable.

FIG. 1 shows a conventional optical fiber cable in a cross-sectional view, in the direction transverse to the axial direction of the cable. The optical fiber cable 10 comprises a plurality of optical fibers 3. Some of these optical fibers 3 are arranged in a buffer tube 2 and surrounded thereby. For instance, twelve optical fibers 3 may be provided within each buffer tube 2. Although an optical fiber cable might comprise only one buffer tube or even only one optical fiber in general, the optical fiber cable 10 addressed in the present application comprises plural buffer tubes 2 and further comprises plural optical fibers 3 in each buffer tube 2. For instance, six buffer tubes 2 may be provided in the optical fiber cable 10, and twelve optical fibers 3 may be provided in each of the buffer tubes 2. This exemplary design is underlying FIG. 1 (conventional cable) as well the embodiments of the present application depicted in FIGS. 2 and 3. Of course, other quantities of optical fibers per buffer tube or of buffer tubes in the optical fiber cable may be chosen as well. For instance, the optical fiber cable 10 may likewise comprise twelve rather than only six buffer tubes.

The plurality of buffer tubes 2 and further optional elements, if any, inside the cable jacket constitute the cable core of the optical fiber cable 10. The cable jacket 1 is provided around the cable core, that is around the plurality of buffer tubes 2. The cable jacket 1 surrounds and encloses the plurality of buffer tubes and thus surrounds the cable core. Optionally, a strengthening element 12 may be provided between the buffer tubes 2, particularly in the center of the plurality of buffer tubes 2. The strengthening element 12 serves to mechanically strengthen the optical fiber cable 10, thereby rendering it more resistant to tensional forces in axial direction or to sheer forces in sections along the optical fiber cable where the cable is to be bent around walls, corners or conducts of a building. By the way, although not being illustrated in FIGS. 1 to 3, a tear line may optionally be arranged inside the optical fiber cable, preferably outside the buffer tubes.

Between the cable jacket 1 and the buffer tubes 2 and/or between the plural buffer tubes 2, interspaces or interstices 11 exist which conventionally are left void, that is which are only filled with air.

In order to render fireproof a fiber cable as depicted in FIG. 1, conventionally the material of the cable jacket 1 and/or of the buffer tubes 2 is chosen appropriately in order to prevent them from catching fire. Accordingly, conventionally the material composition of the cable jacket and/or the buffer tubes is modified so as to include, as a component or ingredient, a fire-retardant additive. In some cases, the composition or compound material containing the fire-retardant additive is provided as an extra layer on the outside of the cable jacket.

Figure 2:
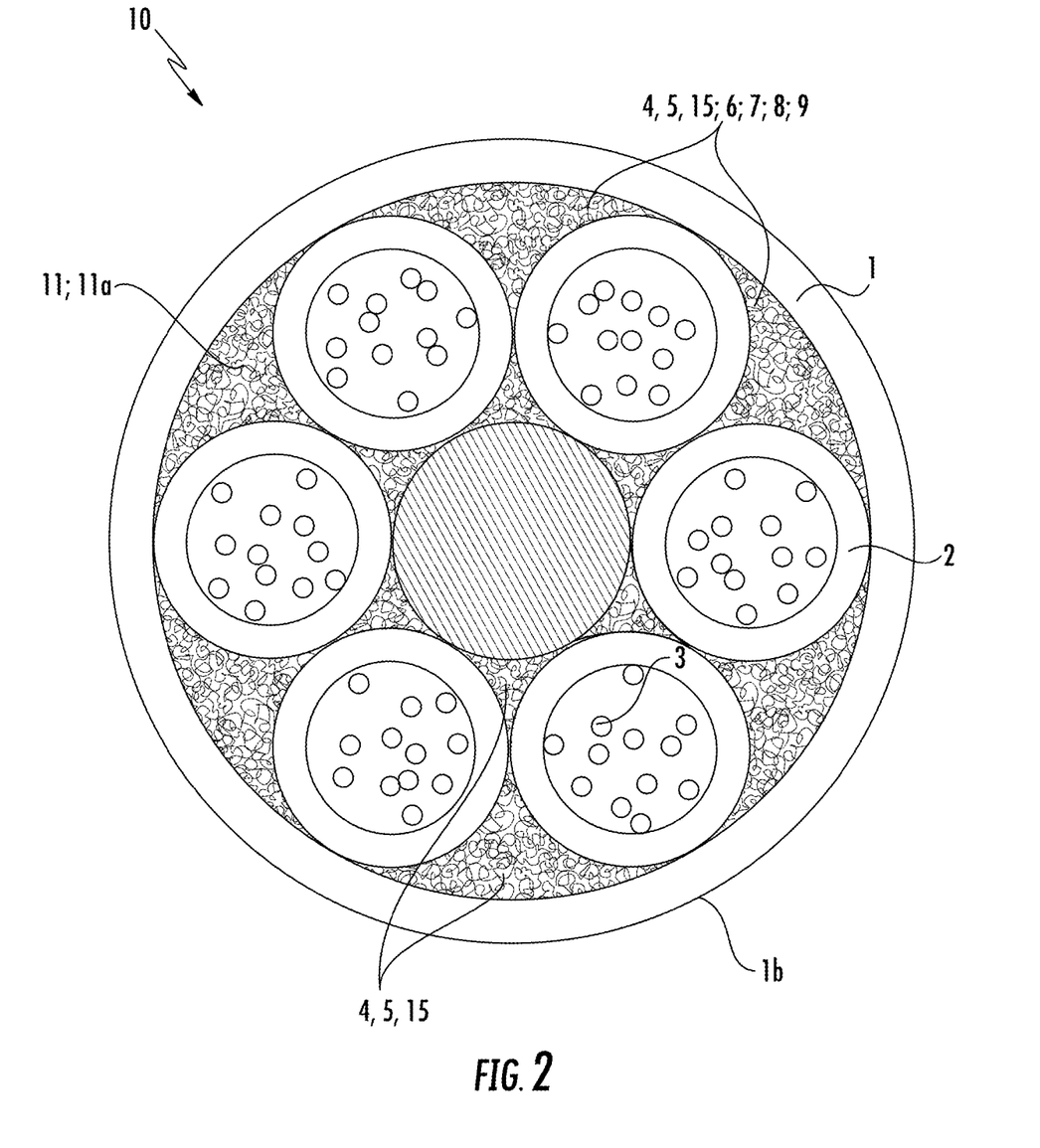
FIG. 2 shows a first exemplary embodiment of an optical fiber cable according to the present application.

FIG. 2 shows a first exemplary embodiment of an optical fiber cable according to the present application. Regarding the design of the optical fiber cable 10 in the cross-sectional plane transverse to the axial direction of the cable, the same basic construction as herein above explained with reference to FIG. 1 may be adopted: the same holds for FIG. 3. For instance, a plurality of six buffer tubes 2 may be provided inside the cable jacket 1, and respective twelve optical fibers 3 may be provided in each of the buffer tubes 2.

In contrast to FIG. 1, however, according to FIG. 2, a fire-retardant material is provided as a separate material inside the optical fiber cable 10. In particular, the fire-retardant material 5 is provided as a material separate from the material of the cable jacket 1 and separate from the material of the buffer tubes 2. Preferably, the fire-retardant material 5 is neither an ingredient nor an additive, but a bulk or volume material. Though in contact with the inward surface 1a of the cable jacket 1 and with the outer surface of each buffer tube 2, the fire-retardant material 5 does not blend or otherwise combine with the material of the jacket or the material of the buffer tubes. Rather, the fire-retardant material 5 is provided as a filling material 4 disposed between the cable jacket 1 and the plural buffer tubes 2, thereby filling the interstices 11 otherwise filled with air in conventional designs. As a consequence, the material of the cable jacket 1 and of the buffer tubes 2 need not be treated, re-designed or otherwise prepared for being mixed with the fire-retardant material 5. Furthermore, vice versa, the separate fire-retardant material 5 need not be chemically treated or otherwise prepared for blending in a mixture with the material of the cable jacket or the buffer tubes. Once the fire-retardant material 5 is being placed in the interstices 11 inside the cable jacket 1, it provides fire protection in case of exposure to fire. Of course, the material of the cable jacket may also be fire-resistant and may contain a fire-retardant material as a component of the composite cable jacket material. However, due to the additional filling material provided according to the present application between the cable jacket and the buffer tubes, fire protection is further improved significantly. In accordance with aspects of the present disclosure, within each buffer tube 2, a plurality of optical fibers 3 is provided. The optical fibers 3 are surrounded by air and are only loosely enclosed by the inward surface of the buffer tube 2.

It may suffice to provide the fire-retardant filling material 4; 5 only in outer interstices 11a arranged, at a radially more exterior position compared to the position of the buffer tubes, between the buffer tubes and the inward surface 1a (FIG. 1) of the cable jacket 1. Accordingly, inner interstices 11b (FIG. 1) between the buffer tubes 2 or between them and a strengthening element 12 need not necessarily be filled with the fire-retardant filling material. However, depending on the amount of fire-retardant material to be placed inside the optical cable and on the particular method of applying the fire-retardant material, the inner interstices 11b may also be filled. As shown in the cross-sectional views of FIGS. 1 and 2, both the outer and inner interstices 11a; 11b have a roughly triangular shape, with the sides of the triangle being concave and/or convex rather than straight.

The fire-retardant filling material 4; 5 may be applied in various conditions or aggregate forms. For instance, the fire-retardant material may be provided in the form of a powder 6, a granulate 7, a paste 8 (for instance an initially wet and subsequently dried paste), or a dispersion 9. Even fire-retardant materials being humid or containing a solvent may be provided as the filling material 4 inside the cable jacket; water or solvents may be evaporated later during manufacture of the optical fiber cable by application of moderate heat.

The fire-retardant material 5 preferably comprises an intumescent material 15. An intumescent material is a material which forms and/or releases a foam when exposed to excessive heat as in the case of fire. When exposed to fire, the intumescent material significantly expands in volume and thus provides good thermal insulation of the region of the optical fiber cable exposed to fire and/or heat. Thermal protection is effected by the micro-porous and thus thermally insulating condition of the foam layer released by the intumescent material 15 or filling material 4, thus protecting the flammable inner core of the cable and/or enclosing regions of the outer cable jacket.

Even in case that the cable has already caught fire, when the fire has penetrated the cable jacket, the intumescent fire-retardant material 5; 15 releases the foam, thereby sealing any puncture or other kind of damage in the mantle, that is the cable jacket. Thereby, combustion of the optical fiber cable or of parts thereof is stopped before the fire can, reach the potentially most combustible materials and then propagate along the cable core.

The intumescent material 15 constituting or contained in the fire-retardant filling material 4; 5 renders the optical cable not only flame-retardant but also self-extinguishable, even when the cable jacket 1 and/or the buffer tubes 2 are made of per se combustible materials such as PE (polyethylene), PP (polypropylene), EVA (ethylene-vinyl acetate) or other synthetics, such as thermoplastics. Indoor cables significantly profit from fire protection as provided by the separate fire-retardant material, particularly by an intumescent fire-retardant material, which is provided in the gaps or interstices 11 in the cable cross-section. Thereby, flames and cable burns are prevented from propagating along the optical cables to neighboring rooms or areas inside a building.

Preferably, the intumescent material 15 or other kind of fire-retardant filling material 4, 5 is selected to be halogen-free, thus being non-poisonous to humans and unable to release toxic gases when ignited. The intumescent material may, for instance, be a highly viscous paintable paste with a viscosity ranging between 28000 to 36000 mPa·s or between 16000 to 22000 mPa·s, for example. The intumescent paint or paste may have a density of between 1.25 and 1.32 $g/m^3$ and a pH-value of between 7.5 and 8.2, for example.

As a further benefit of the fire-retardant material 5 provided as a pure substance filling the inner and/or outer interstices 11b; 11a in the cable cross-section, a very small amount of the fire-retardant material per length of the fiber optical cable may suffice for achieving effective fire protection, since close to 100% of the volume or partial volume of the voids filled with the fire-retardant material 5 contains a highly concentrated (close to 100%) fire protecting substance in undiluted form.

Preferred intumescent materials, for instance, are inorganic material containing chemically bound water, such as a metal hydroxide.

Furthermore, an intumescent material that produces a carbonaceous char when exposed to fire and/or heat can be employed. The intumescent material may contain a hydrate, a silicate or graphite.

As an alternative to the intumescent material 15, the fire-retardant material 5 may likewise be an inorganic material containing chemically bound water, such as a metal hydroxide or another water-bearing, that is water-containing material or substance, such as hydrates, for instance. In case of a metal hydroxide, magnesium hydroxide or aluminum hydroxide may for instance be used as the fire-retardant material 5 or as a component thereof.

Figure 3:
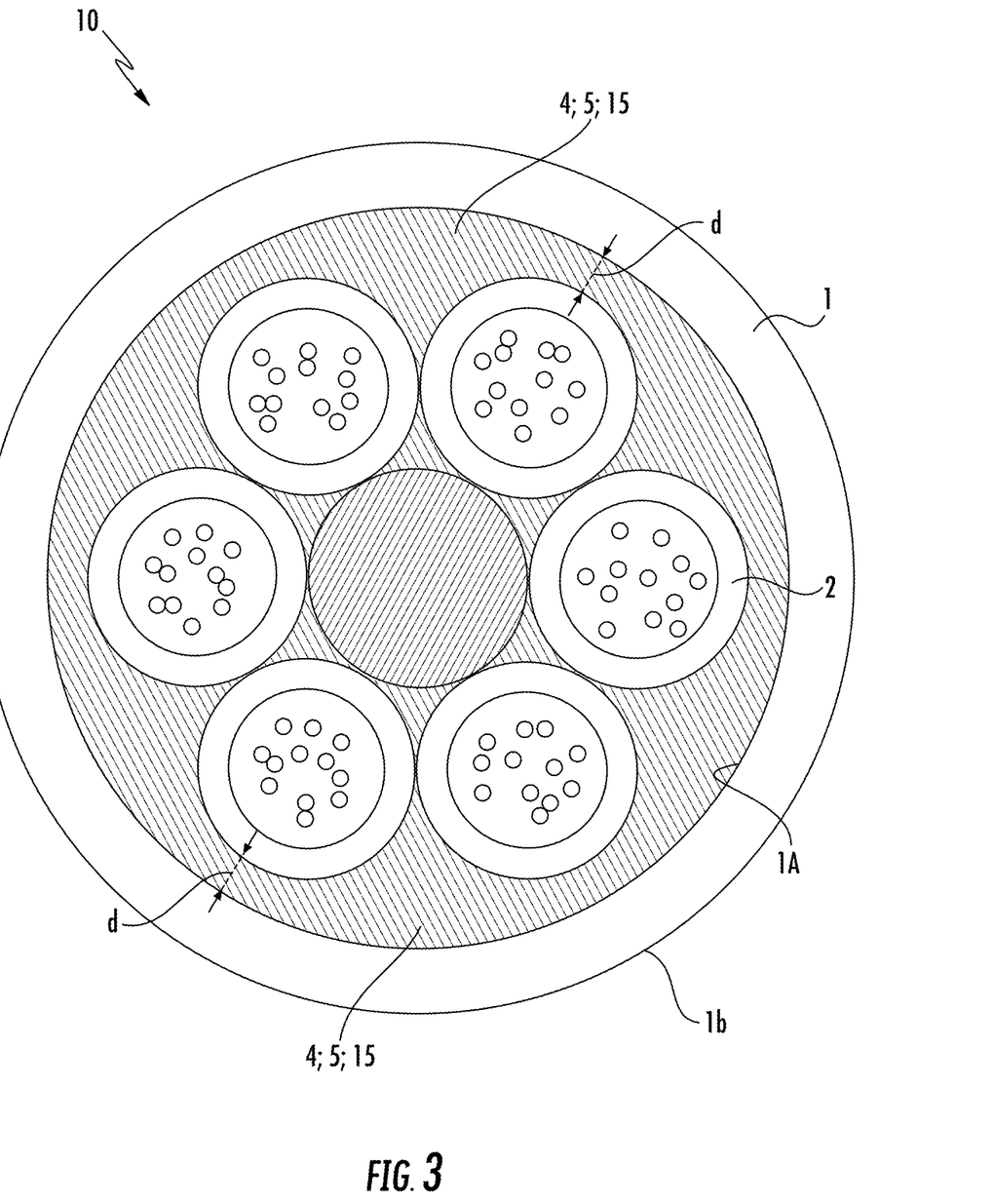
FIG. 3 shows a second exemplary embodiment of an optical fiber cable according to the present application.

All features discussed above with reference to FIGS. 1 and 2 equally apply to FIG. 3, which shows a second embodiment of the optical fiber cable 10. Particularly, the same materials discussed with reference to FIG. 2 may be used for the intumescent or otherwise fire-retardant filling material 4; 5; 15. Furthermore, the same materials as mentioned with reference to FIG. 1 for the cable jacket 1 or the buffer tubes 2 may be used.

According to FIG. 3, the fire-retardant material 5 has a thickness ensuring a radial distance d between the buffer tubes 2 and the inward surface 1a of the cable jacket 1. As a consequence, even in the thinnest regions of and/or between the outer interstices 11; 11a surrounding the buffer tubes 2, there is no contact or abutting between the outer surfaces of the buffer tubes 2 and the inward surface 1a of the cable jacket 1. Instead, in all azimuthal directions from 0° to 360°, a certain minimum radial distance d between the inner surface 1a of the cable jacket 1 and the nearest surface of the next buffer tube 2 is ensured. This minimum radial distance d may be chosen to be in the range between 0.1 and 0.5 mm or even larger. These dimensions may, for instance, apply to optical fiber cables having a diameter, including the cable jacket, of between 5 and 10 mm, especially to indoor cables. The minimum thickness of the intumescent or otherwise fire-retardant filling material 5 may be realized by choosing an appropriate manufacturing method for forming, particularly filling, the optical fiber cable, as for instance discussed later with reference to FIG. 5 or 6.

Whereas FIGS. 2 and 3 show that the fire-retardant material 5 is provided both in the outer interstices 11a as well as in the inner interstices 11b, it may equally suffice to fill only the outer interstices 11b, that is the outer perimeter around the buffer tubes 2 of the cable core, with the fire-retardant material. Whether the inner interstices 11b are filled or not may be chosen according to the manufacturing method for forming the optical fiber cable. Since it may suffice to fill only the outer interspaces 11a between the buffer tubes 2 and the cable jacket 1, the fire-retardant filling material 4; 5; 15 is applied like an intumescent paint on the outside of the cable core. Sufficient thickness of the paint provided, the minimum radial distance d is easily achieved.

In FIGS. 2 and 3, the optical fiber cable 10 particularly is an uncoated fiber cable, that is a fiber cable whose cable jacket 1 does not comprise any additional coating on the outside. In particular, the outward surface 1b of the one-layer-cable jacket 1 is particularly free of any fire-retardant or otherwise fire-protecting cover or coating material since, due to the presence of the fire-retardant, preferably intumescent material 5; 15 underneath, the cable jacket 1 may directly be exposed to the ambient air without any further protection.

For clarity, it is noted that the cable jacket 1 is not a fiber jacket or fiber coating of an individual, single optical fiber, since the cable jacket 1 surrounds a plurality of at least two buffer tubes 2 and each buffer tube 2 in turn surrounds a plurality of at least two optical fibers 3. Nonetheless, each optical fiber 3 inside the cable per se can be designed in conventional manner and thus can contain a fiber core (8 µm in diameter, for instance), a cladding (125 µm in diameter, for instance), a buffer layer (250 µm in diameter, for instance) and a fiber jacket. The fiber jacket of the individual optical fiber 3 thus represents the cylindrical outer fiber surface and may be 400 µm in diameter, for instance. The diameter of the cable jacket 1 of the entire optical fiber cable 10, however, may be in the range between 5 and 10 mm, for instance.

There are plural ways of applying the fire-retardant material as a filling material between the buffer tubes and the cable jacket. Technically, when an optical fiber cable is produced, the cable jacket or sleeve is formed around the cable core which comprises the assembly of buffer tubes. Accordingly, when the intumescent or otherwise fire-retardant material 5; 15 is applied as a filling material 4 between the buffer tubes and the cable jacket, the fire-retardant material has to be applied first before or at the latest when the surrounding cable jacket is applied.

Appropriate tools for injecting or otherwise applying a fire-retardant material may, for instance, be included in an apparatus for forming the cable jacket around the cable core. For example, the perimeter of the cable core may be coated with the fire-retardant material before or concurrently with forming the cable jacket around it.

According to the application, the intumescent or otherwise fire-retardant material 5; 15 is provided as a filling material between the cable core and the cable jacket, thereby departing from conventional designs which include fire-retardant additives as ingredients of compound materials of the buffer tubes and/or the cable jacket. As a further benefit, according to the present application, unconventional forms or aggregates of the fire-retardant material may be provided inside the cable. For instance, the fire-retardant material need not be provided in the form of a continuous, homogenous mass as is the case for synthetic materials. Rather, the fire-retardant material may be provided as a powder, a granulate or even a paste or a dispersion. For example, a brittle or easily disintegrating granulate or powder may be applied around the cable core as the inner filling material, since it will later be enclosed by the cable jacket and thus protected from falling off.

There are various methods of applying the fire-retardant material as the filling material. As a preparatory step for such methods, a dry, solid fire-retardant material (first medium 17) may be mixed with a second medium 18 for the purpose of being applied to the perimeter of the cable core. The second medium 18 may be removed later, thereby regaining the original state and/or condition of the fire-retardant material. For instance, a powder 6 or granulate 7 of the intumescent or otherwise fire-retardant material 5; 15 may be mixed with a liquid, fluid and/or viscous second medium 18, for instance with a highly volatile liquid. As a result of mixing these two media 17, 18 together, a paste 8 or a dispersion 9 is obtained as a compound medium 16 which may be more easily applicable to the perimeter of the cable core.

Preparation of the paste or dispersion for application to the outer cable core, for instance using those methods discussed below with reference to FIGS. 4 to 6, does not require to transform or convert the fire-retardant material by chemical reaction with the second medium. Instead, the fire-retardant material, be it in the form of a powder or a granulate or another form, remains chemically unaltered and is only surrounded and carried along as the second medium 18 is applied to the cable core. As a consequence, no heat treatment or chemical reaction is required for forming the paste or dispersion out of the first and second medium 17, 18, thus rendering the preparatory steps for application of the fire-retardant material 5; 15 to the cable core perimeter far easier and less costly than conventional methods. Such conventional methods often require chemical transformation for generating bedding materials and require excessive heating in order to trigger the chemical formation of the bedding material. In contrast thereto, mixing a powder or granulate of a per se fire-retardant material with a second medium to form a paste or dispersion is executable at room temperature and is less costly and effort some.

Whenever a dispersion 9 is referred to in the present application, the dispersion 9 preferably is a suspension 19, comprising the fire-retardant material 5; 15 in the form of solid particles within the liquid or viscous second medium 18. In particular, the fire-retardant material 5 or intumescent material 15 does not need to be diluted or dissolved in a solvent; rather, it may be maintained in solid state (powder, granulate, grains or particles etc.).

A conceivable way of applying the fire-retardant material, as a paste or dispersion/suspension as described above, is to paint it or to brush it onto the perimeter of the cable core. For instance, a brush or a sponge or a plurality of them may be used to coat the cable core. Alternatively, a liquid or dispersion comprising small particles of the fire-retardant material 5 may be sprayed onto the cable core 20. However, smooth, even and uniform coverage of the cable core perimeter might be difficult or unreliable to ensure. Therefore, more preferred alternative methods are described hereinbelow with reference to FIGS. 4, 5 and 6.

Figure 4:
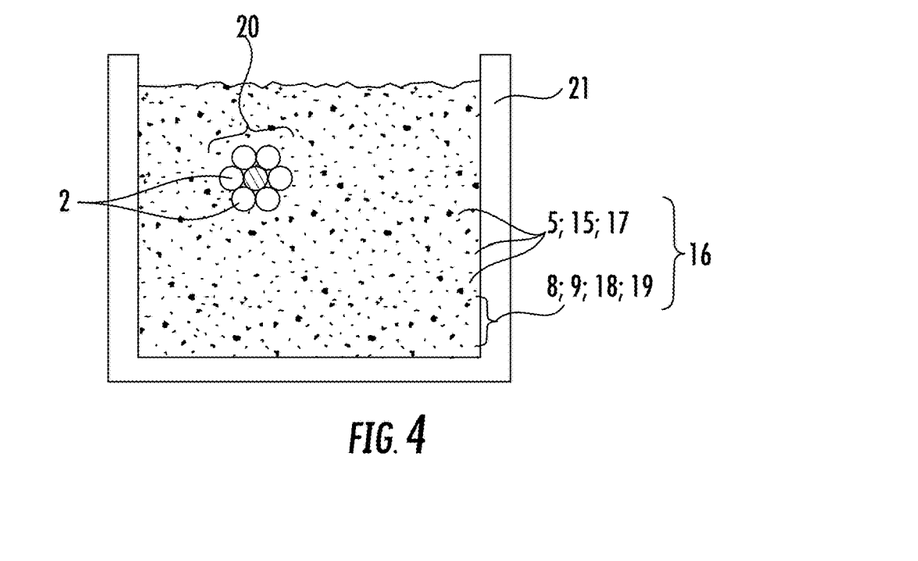
FIG. 4 shows a preparatory step for applying a fire-retardant material around a cable core.

FIG. 4 shows a container 21 in which a mixture of the fire-retardant material 5 and another liquid or viscous second medium 18 is mixed and/or contained. The cable core 20 or at least a section of it is dipped or submerged into the paste 8 or dispersion 9/suspension 19 which contains the fire-retardant, preferably intumescent material 5; 15. The paste 8 or dispersion 9 may contain solid particles of powder 6 or granulate 7 of the fire-retardant material 5 (first medium 17) and the second medium 18 in liquid or viscous form. Preferably, a volatile liquid is used as the second medium 18. Both the first and second medium 17, 18, when mixed together, form a compound medium 16 in which the fire-retardant material 5 still is contained and preserved as a chemically uncombined pure substance, preferably in solid form. Accordingly, though being mixed with the second medium 18, the first medium 17 or intumescent material 15 does not chemically combine or react with the second medium. Particularly, no heat has to be applied for obtaining the paste 8 or dispersion 9.

Although an open container 21 is depicted in FIG. 4, a closed container can equally be used for accommodating the compound medium 16, for instance for exerting pressure on the compound medium 16 to force it through an outlet opening through which also the cable core 20 exits the container.

Figure 5:
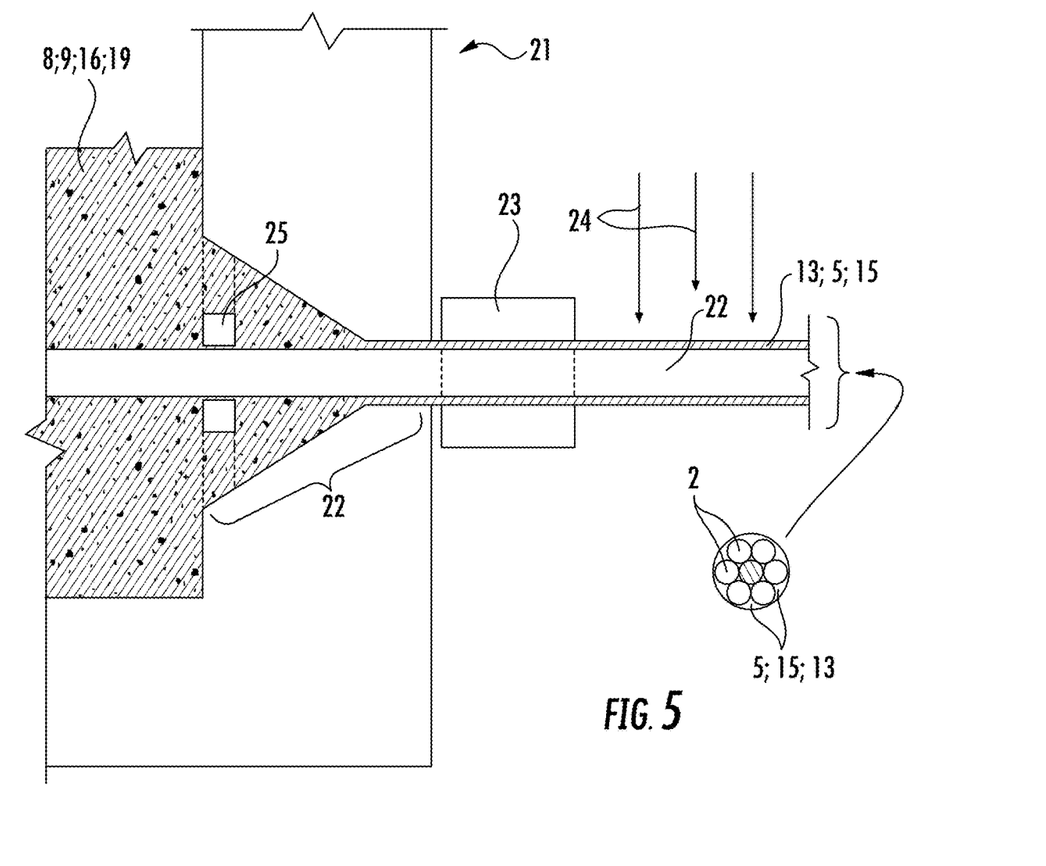
FIG. 5 shows a method for coating the cable core 20 with a layer of the fire-retardant material 5; 15 for manufacture of the optical fiber cable.

FIG. 5 shows an exemplary technique of coating the cable core 20 with a layer of the fire-retardant material 5; 15 for manufacture of the optical fiber cable. As indicated in FIG. 5, the fiber core 20 is moved lengthwise, along its axial direction, through an outlet opening 22 provided in a wall or a bottom region of a container 21, for instance of the container of FIG. 4. The outlet opening 22 has a circular, cylindrical cross-section slightly larger than the diameter of the cable core 20. Accordingly, the size of the opening is dimensioned such that when the cable core 20 is pulled through or pushed through the outlet opening 22, its perimeter is automatically covered with a thin layer, that is coating, of the compound medium 16 or fire-retardant material 5 of uniform thickness. The coating fills at least the outer gaps between adjacent buffer tubes of the cable core.

The outlet opening 22 in the wall or bottom region of the container 21 may comprise a guiding ring 25 through which the fiber core 20 is pulled or pushed first, before reaching the exterior region of the outlet opening 22. Thereby, a centered position of the fiber core 20 in relation to the cross-sectional center of the outlet opening 22 is ensured, especially in relation to the narrowed Opening region shown right-hand in FIG. 5. The cable core passes through the guiding ring 25 on the inside. A sufficient amount of the compound medium, that is of the intumescent or otherwise flame-resistant material 5; 15 may pass outside the guiding ring 25 before coating the cable core perimeter, thereby forming a coating 13 around the still unjacketed cable core 20.

Outside of the container 21, the fiber core 20 coated with the compound medium 16 comprising the fire-retardant material 5; 15 may be subjected to a moderate heating process in order to vaporize and thereby remove and thus separate the volatile second medium 18 from the fire-retardant material 5; 15. For instance, a heated air stream 24 may be applied for vaporizing the second medium 18. Alternatively or in addition, the heat dryer 23 may be provided around the perimeter of the coated cable core 20 exiting the container 21. Although depicted in FIG. 5 as directly abutting the outer surface of the fire-retardant coating 13; 5; 15, the heat dryer 23 may likewise be spaced apart from the coating 13 so as to better enable vaporization of the second medium 18 out of or off the coating 13. One or a plurality of infrared lamps may be used as the heat dryer 23, for instance. Preferably, the temperature of the heating is chosen to be moderate, for instance below 100° C.

For jacketing the coated but still unjacketed cable core 20 shown right-hand in FIG. 5, the coated cable core 20 is delivered to a jacketing tool. Thereafter, the coating 13 will present the filling material 4 around and/or in the cable core 20, particularly between the buffer tubes 2 and the cable jacket 1.

After the cable jacket is formed, it permanently encloses and surrounds the flame-resistant material 5; 15. Thus a novel optical fiber is provided according to the present application. For forming the cable jacket, conventional techniques including injection molding and/or extruding may be applied.

Figure 6:
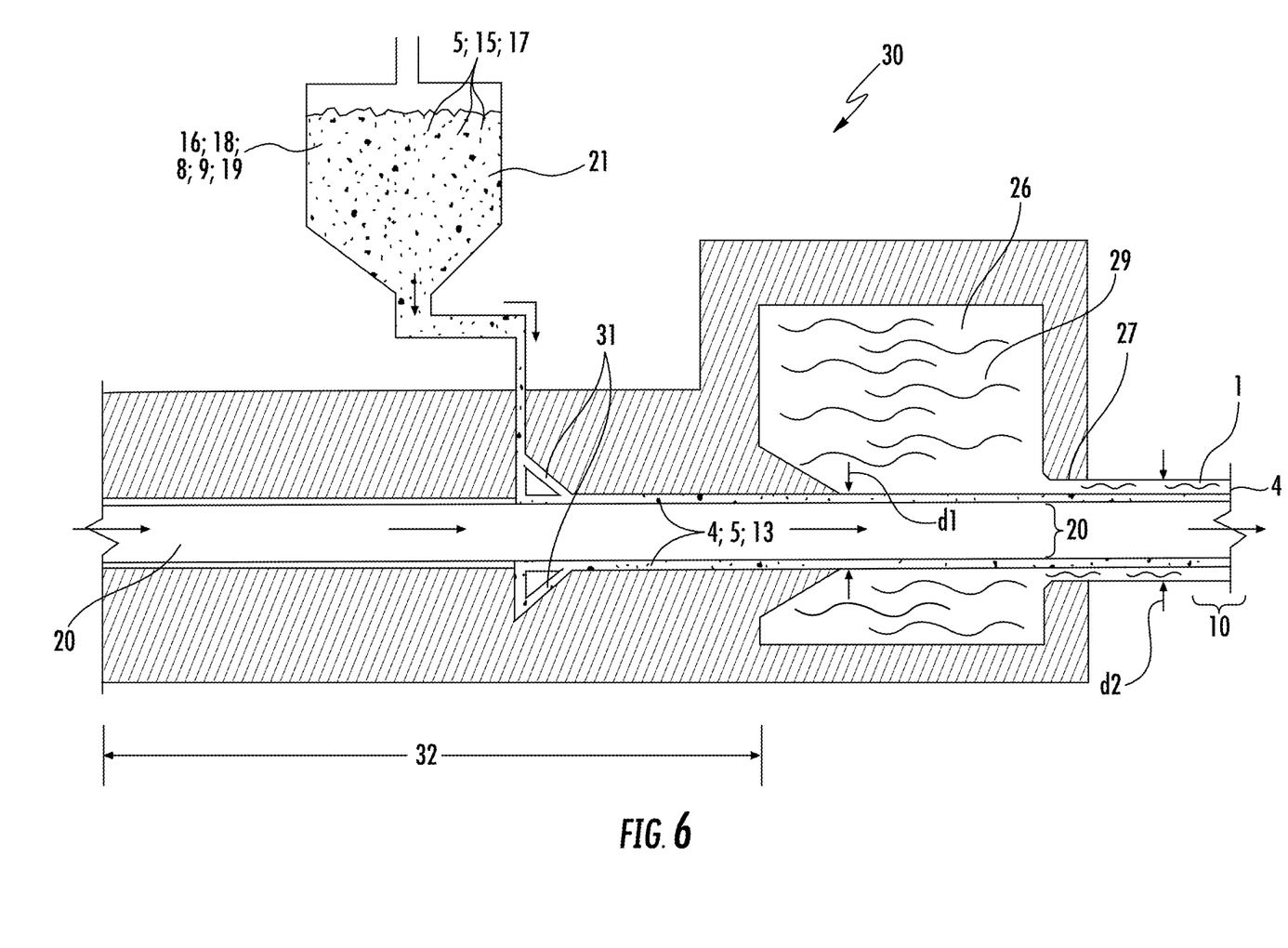
FIG. 6 shows a method for combinedly applying a coating of the fire-retardant material as well as a cable jacket around a cable core.

FIG. 6 shows an apparatus and a technique for combined application of a coating of the fire-retardant material and of the cable jacket around the cable core. A combined coating and jacketing tool 30 coats the cable core 20 with a layer of the fire-retardant material and also forms the cable jacket 1 around it, thus completing the manufacture of the optical fiber cable 10. The coating and jacketing tool 30 comprises an extrusion molding chamber 26 in which the jacket material 29 for the cable jacket 1 is enclosed, preferably under pressure in order to three it through an extrusion chamber outlet 27. The tool 30 further comprises a container 21 for feeding the compound medium 16, as described herein above, under pressure onto the perimeter of the cable core and then into the extrusion molding chamber 26. In FIG. 4, 5 or 6, a gear pump (not illustrated) may for instance be used for supplying the fire-retardant material 5 or the compound medium 16 containing it.

The cable core 20 comprising the plurality of buffer tubes 2 and the strengthening element 12, without the jacket and without the fire-retardant material 5, is fed into the extrusion molding chamber 26 via the cable core feeding path 32.

Along the cable core feeding path 32, an inlet nozzle 31 approaches and surrounds a section of the feeding path 32. Through the inlet nozzle 31, the pressurized combined medium 16, that is the paste 8 or dispersion 9 comprising the fire-retardant material 5 in the second medium 18 is supplied, thereby coating the cable core 20 before it enters the extrusion molding chamber 26. Between the inlet nozzle 31 and the entrance of the extrusion molding chamber 26, the cross-sectional diameter d1 of the feeding path 32 is widened compared to its diameter ahead of the inlet nozzle 31, thereby ensuring a uniform thickness of the coating 13, that is the intumescent or otherwise fire-retardant material 5, 15 all around the cable core 20. Between the inlet nozzle 31 and the entrance of the extrusion molding chamber 26, a heating device such as that depicted in FIG. 5 may be provided (not illustrated in FIG. 6). Furthermore, the feeding path 32, in a region between the inlet nozzle 31 and the extrusion molding chamber 26, may be interrupted so as to expose the applied coating 13 to the ambient air and/or to a heated air stream.

Upon entering the extrusion molding chamber 26, the coating 13 around the cable core 20 is covered with the jacketing material 29 which is then extruded, at the extrusion chamber outlet 27 serving as an extruder dye, to form the jacketed and thus completed optical fiber cable 10. The extrusion chamber outlet 27 has a second diameter d2 larger than the first diameter d1 of the entrance of the extrusion molding chamber 26, thus determining the thickness of the cable jacket 1 around the coating 13 of the filling material 4.

The combined coating and jacketing tool 30 used according to FIG. 6 may be an extruder for extruding the cable jacket material onto the coated cable core 20.

Generally, the intumescent or otherwise fire-retardant material 5, 15 may likewise be extruded or co-extruded. However, it is to be noted that the fire-retardant material 5, 15 per se neither needs to be extruded nor to be compounded or mixed with other materials, since the material 5, 15 will ultimately be formed, around the cable core, as a pure mass, that is as a bulk material or volume material in an unmixed and/or chemically uncombined state. Furthermore, the material 5, 15 preferably is a matrix-free, especially a polymer-matrix-free material which does not contain any polymer or polymer matrix material. Accordingly, in contrast to bedding materials which require an extrusion process at elevated temperatures for any step of reshaping, the powder, granulate, paste, dispersion or other kind of the fire-retardant material 5, 15 according to this application is a material that can be applied and/or put into any shape at room temperature. Accordingly, the fire-retardant material 5 is cold-deformable or at least cold-wet-deformable material. This is not the case for conventional bedding materials which have to be heated for being mixed or compounded. Depending on the particular embodiment regarding the kind of the fire-retardant material 5, 15, water or humidity may have to be applied to do shaping or reshaping.

Thus, in FIG. 6 the intumescent, fire-retardant material 5, 15 around the cable core is fed into the chamber 27 of the extruder 30 for applying the cable jacket but is not extruded itself. Preferably, the fire-retardant material 5, 15 is already dried when entering the chamber 27 of the extruder 30. To this end, as noted above, the fire-retardant material 5, 15 can be heated moderately in order to vaporize the volatile second medium 18, thereby stiffening and/or hardening the applied fire-retardant material 5, 15. The fire-retardant material 5, 15 may thus be hardened without triggering any chemical reaction of the fire-retardant material 5, 15 with the second medium or with any other substance or material composition. In this context, hardening does not mean baking, since the fire-retardant material 5, 15 need not be chemically transformed. Rather, hardening merely means removing any volatile second medium, such as water, another polar medium or a volatile, but for instance inpolar medium, from the compound medium 16 containing the fire-retardant material 5, 15.

The finished cable core as delivered by the extrusion chamber outlet 27 has a cross-sectional structure as depicted in FIG. 2 or, preferably in FIG. 3 of the present application. The minimum radial distance d of the fire-retardant and/or intumescent material 5; 15 in the cable corresponds to half of the difference between d2 and d1.

Preferably, the intumescent, fire-retardant material 5, 15 thus provided in a cable is halogen-free, thus being incapable of releasing toxic gases and, therefore, being suitable especially for indoor cables.

The invention claimed is:

1. An optical fiber cable comprising:
   a cable jacket,
   a plurality of buffer tubes arranged on the inside of the cable jacket,
   a plurality of optical fibers arranged on the inside of each buffer tube, and
   a fire-retardant material having intrinsic fire-retarding properties,
   wherein the fire-retardant material is a filling material disposed between the cable jacket and the buffer tubes; and
   wherein the fire-retardant material surrounds a cable core comprising the plurality of buffer tubes, wherein outside the cable core the fire-retardant material has a minimum thickness providing a radial distance between outer surfaces of the buffer tubes and an inward surface of the cable jacket such that there is no contact between the outer surfaces of the buffer tubes and the inward surface of the cable jacket.

2. The optical fiber cable of claim 1,
   wherein the fire-retardant material is a filling material provided in the form of a powder, a granulate, a dried paste, or a dispersion.

3. The optical fiber cable of claim 1,
   wherein the fire-retardant material is a filling material containing an intumescent material.

4. The optical fiber cable of claim 1,
   wherein the fire-retardant material is an intumescent material provided, as an unmixed and/or chemically uncombined pure substance, between the cable jacket and the plurality of buffer tubes.

5. The optical fiber cable of claim 1,
   wherein the fire-retardant material is an inorganic material containing chemically bound water, such as a metal hydroxide.

6. The optical fiber cable of claim 3,
   wherein the intumescent material is a material that produces a carbonaceous char when exposed to fire and/or heat.

7. The optical fiber cable of claim 3,
   wherein the intumescent material contains a hydrate, a silicate or graphite.

8. The optical fiber cable of claim 1,
   wherein the fire-retardant material is filled in interstices between the buffer tubes and an inward surface of the cable jacket.

9. The optical fiber cable of claim 1,
   wherein the optical fiber cable is an indoor cable and wherein the fire-retardant material is a halogen-free filling material.

10. A method of forming an optical fiber cable, the method comprising:
    a) assembling a cable core comprising a plurality of buffer tubes each enclosing a plurality of optical fibers on the inside,
    b) applying a fire-retardant material around the cable core, and
    c) forming a cable jacket around the cable core and the fire-retardant material,
    thereby providing an optical fiber cable which comprises the fire-retardant material as a filling material disposed between the buffer tubes and the cable jacket;
    wherein outside the cable core the fire-retardant material has a minimum thickness providing a radial distance between outer surfaces of the buffer tubes and an inward surface of the cable jacket such that there is no contact between the outer surfaces of the buffer tubes and the inward surface of the cable jacket.

11. The method of claim 10, wherein step b) and/or step c) includes applying a material in the form of a powder, a granulate, a paste, or a dispersion around the outer surface of the buffer tubes, wherein the material contains the fire-retardant material as a pure substance.

12. The method of claim 10, wherein step b) and/or step c) includes applying the fire retardant material as a coating around the cable core before and/or during extruding the cable jacket around the cable core.

13. The method of claim 10, wherein applying the fire-retardant material includes:
    mixing the fire-retardant material, as a pure substance in the form of a powder or a granulate, with a liquid or a viscous second medium, thus obtaining a paste or a dispersion,
    applying the paste or dispersion to the cable core, and
    drying the paste or dispersion to fix the fire-retardant material as the powder or granulate around the cable core.

14. The method of claim 10, wherein the fire-retardant material is or comprises an intumescent material.

15. The optical fiber cable of claim 1, wherein the radial distance is from 0.1 mm to 0.5 mm.

16. The optical fiber cable of claim 15, wherein the cable jacket has an outward surface defining an outer diameter of the optical fiber cable of from 5 mm to 10 mm.

17. The method of claim 15, wherein step b) further comprises applying the fire-retardant material along a feed path having a first diameter, wherein extruding the cable jacket around the core further comprises extruding the cable jacket through an outlet having a second diameter that is greater than the first diameter, and wherein the radial distance corresponds to half of the difference between the second diameter and the first diameter.

18. An optical fiber cable comprising:
    a cable jacket,
    a plurality of buffer tubes arranged on the inside of the cable jacket,
    a plurality of optical fibers arranged on the inside of each buffer tube, and
    a fire-retardant material having intrinsic fire-retarding properties,
    wherein the fire-retardant material is a filling material disposed between the cable jacket and the buffer tubes; and wherein the fire-retardant material fills inner interstices and outer interstices between the plurality of buffer tubes;

wherein, in all azimuthal direction from 0° to 360°, the fire retardant material provides a radial distance of at least 0.1 mm between an inner surface of the cable jacket and a nearest outer surface of each of the plurality of buffer tubes.

\* \* \* \* \*

UNITED STATES PATENT AND TRADEMARK OFFICE
CERTIFICATE OF CORRECTION

PATENT NO. : 10,678,009 B2  
APPLICATION NO. : 15/843568  
DATED : June 9, 2020  
INVENTOR(S) : Emanuela Gallo et al.

Page 1 of 1

It is certified that error appears in the above-identified patent and that said Letters Patent is hereby corrected as shown below:

On the Title Page

Item [57], Abstract, Line 5, delete "tire-retarding" and insert -- fire-retarding --, therefor.

On Page 2, Item [56], Other Publications, Line 9, after "Preparation" insert -- and --.

In the Claims

Column 12, Line 29, Claim 12, delete "fire retardant" and insert -- fire-retardant --, therefor.

Column 12, Line 49, Claim 17, delete "15," and insert -- 12, --, therefor.

Column 13, Line 5, Claim 18, delete "fire retardant" and insert -- fire-retardant --, therefor.

Signed and Sealed this  
Eleventh Day of August, 2020

Andrei Iancu  
*Director of the United States Patent and Trademark Office*